United States Patent
Zhao et al.

(10) Patent No.: US 10,062,401 B1
(45) Date of Patent: Aug. 28, 2018

(54) NEAR FIELD TRANSDUCERS (NFTS) INCLUDING A PROTECTIVE LAYER AND METHODS OF FORMING

(71) Applicant: SEAGATE TECHNOLOGY LLC, Cupertino, CA (US)

(72) Inventors: Tong Zhao, Eden Prairie, MN (US); Justin Brons, Savage, MN (US); Michael Kautzky, Eagan, MN (US)

(73) Assignee: Seagate Technology LLC, Cupertino, CA (US)

( * ) Notice: Subject to any disclaimer, the term of this patent is extended or adjusted under 35 U.S.C. 154(b) by 0 days.

(21) Appl. No.: 15/681,808

(22) Filed: Aug. 21, 2017

Related U.S. Application Data (63) Continuation of application No. 15/166,774, filed on May 27, 2016, now Pat. No. 9,741,381.

(60) Provisional application No. 62/167,324, filed on May 28, 2015.

(51) Int. Cl.
*G11B 5/09* (2006.01)
*G11B 5/60* (2006.01)
*G11B 5/00* (2006.01)

(52) U.S. Cl.
CPC .... *G11B 5/6082* (2013.01); *G11B 2005/0021* (2013.01)

(58) Field of Classification Search
None
See application file for complete search history.

(56) References Cited

U.S. PATENT DOCUMENTS

| | | |
|---|---|---|
| 5,897,931 A | 4/1999 | Ahlert |
| 7,782,569 B2 | 8/2010 | Cheng |
| 8,009,387 B2 | 8/2011 | Cheng |
| 8,018,682 B2 | 9/2011 | Cheng |
| 8,958,271 B1 | 2/2015 | Peng |
| 8,976,634 B2 | 3/2015 | Cheng |
| 9,058,824 B2 | 6/2015 | Cheng |
| 9,548,076 B2 | 1/2017 | Huang |
| 2007/0177302 A1 | 8/2007 | Shimazawa |
| 2010/0123965 A1 | 5/2010 | Lee |
| 2011/0209165 A1 | 8/2011 | Tsai |
| 2012/0026846 A1 | 2/2012 | Komura |
| 2013/0107679 A1 | 5/2013 | Huang |
| 2013/0148485 A1 | 6/2013 | Jin |
| 2013/0279315 A1 | 10/2013 | Zhao |
| 2014/0043319 A1 | 2/2014 | Roseborough et al. |

(Continued)

FOREIGN PATENT DOCUMENTS

| | | |
|---|---|---|
| JP | 2012-212495 | 11/2012 |
| KR | 10-2008-0068583 | 7/2008 |

*Primary Examiner* — Peter Vincent Agustin
(74) *Attorney, Agent, or Firm* — Mueeting, Raasch & Gebhardt, P.A.

(57) ABSTRACT

Devices having air bearing surfaces (ABS), the devices include a near field transducer (NFT) that includes a disc; a peg, the peg including gold (Au), silver (Ag), copper (Cu), aluminum (Al), rhodium (Rh), iridium (Ir), or combinations thereof; and the peg having a front surface at the air bearing surface of the device, an opposing back surface, a top surface that extends from the front surface to the back surface, two side surfaces that extend from the front surface to the back surface and a bottom surface that extends from the front surface to the back surface; and a protective layer disposed on at least one surface of the peg, the protective layer comprising an oxide of a metal that has a higher oxidation tendency than that of the material of the peg.

20 Claims, 3 Drawing Sheets

(56) References Cited

U.S. PATENT DOCUMENTS

| | | |
|---|---|---|
| 2014/0153136 A1 | 6/2014 | Flint |
| 2014/0254335 A1 | 9/2014 | Gage |
| 2014/0307534 A1 | 10/2014 | Zhou |
| 2014/0376345 A1 | 12/2014 | Seets |
| 2014/0376348 A1 | 12/2014 | Cheng |
| 2014/0376349 A1 | 12/2014 | Cheng |
| 2015/0063086 A1 | 3/2015 | Wierman |
| 2015/0179194 A1 | 6/2015 | Cheng |
| 2015/0287425 A1 | 10/2015 | Guler |
| 2015/0318003 A1 | 11/2015 | Cheng |
| 2016/0133291 A1 | 5/2016 | Chen |
| 2016/0351221 A1 | 12/2016 | Blaber |

NEAR FIELD TRANSDUCERS (NFTS) INCLUDING A PROTECTIVE LAYER AND METHODS OF FORMING

PRIORITY

This application claims priority to U.S. Provisional Application No. 62/167,324 entitled, NEAR FIELD TRANSDUCERS (NFTS) ASSOCIATED STRUCTURES AND METHODS OF FORMING, filed on May 28, 2015 the disclosure of which is incorporated herein by reference thereto.

SUMMARY

Disclosed herein are devices having air bearing surfaces (ABS), the devices include a near field transducer (NFT) that includes a disc; a peg, the peg including gold (Au), silver (Ag), copper (Cu), aluminum (Al), rhodium (Rh), iridium (Ir), or combinations thereof; and the peg having a front surface at the air bearing surface of the device, an opposing back surface, a top surface that extends from the front surface to the back surface, two side surfaces that extend from the front surface to the back surface and a bottom surface that extends from the front surface to the back surface; and a protective layer disposed on at least one surface of the peg, the protective layer comprising an oxide of a metal that has a higher oxidation tendency than that of the material of the peg.

Also disclosed are devices having air bearing surfaces (ABS), the devices including a near field transducer (NFT) that includes a disc; a peg, the peg comprising rhodium (Rh); and the peg having a front surface at the air bearing surface of the device, an opposing back surface, a top surface that extends from the front surface to the back surface, two side surfaces that extend from the front surface to the back surface and a bottom surface that extends from the front surface to the back surface; and a protective layer disposed on at least one surface of the peg, the protective layer including an oxide of one or more metals selected from: palladium (Pd), iron (Fe), yttrium (Y), aluminum (Al), silicon (Si), chromium (Cr), tantalum (Ta), titanium (Ti), zirconium (Zr), lanthanum (La), molybdenum (Mo), nickel (Ni), cobalt (Co), germanium (Ge), ruthenium (Ru), iridium (Ir), platinum (Pt), or combinations thereof.

Also disclosed are methods of forming a NFT, the NFT including a peg including a plasmonic material and having at least one protective layer that includes an oxide of a metal thereon, the method including the steps of depositing the plasmonic material and the metal; forming the deposited plasmonic material and the metal into the peg of the NFT; and subjecting the peg to an oxidation treatment to oxidize the deposited metal to form the protective layer on the peg.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

BRIEF DESCRIPTION OF THE DRAWINGS

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

The present disclosure generally relates to data storage devices that utilize heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic media during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the paramagnetic effect.

A laser or other energy source may be directly (e.g., surface-attached) or indirectly (e.g., via optical fiber) coupled to a HAMR read/write head. An optical path (e.g., waveguide) is integrated into the read/write head and delivers the light to a media-facing surface of the read/write head. Because the size of the desired hotspot (e.g., 50 nm or less) is smaller than half a wavelength of the laser light (e.g., 800-1550 nm), conventional optical focusers (e.g., lenses) are diffraction limited and cannot be used to focus the light to create the hotspot. Instead, a near-field transducer (NFT) is employed to direct energy out of the read/write head. The NFT may also be referred to as a plasmonic transducer, plasmonic antenna, near-field antenna, nano-disc, nano-patch, nano-rod, etc.

Generally, the NFT is formed by depositing a thin-film of material such as gold, silver, copper, etc., near an integrated optics waveguide or some other delivery system. When exposed to laser light that is delivered via the waveguide, the light generates a surface plasmon field on the NFT. The NFT is shaped such that the surface plasmons are directed out of a surface of the write head onto a magnetic recording medium.

Due to the intensity of the laser light and the small size of the NFT, the NFT and surrounding material are subject to a significant rise in temperature during writing. Over time, this can affect the integrity and/or reliability of the NFT, for example, causing it to become misshapen or recess. Other events, such as contact between the read/write head and recording medium, contamination, etc., may also degrade the operation of the NFT and nearby optical components. Degradation of the NFT will affect the effective service life of a HAMR read/write head. In view of this, methods and apparatuses described herein are used to increase the thermal robustness of the NFT, such as at a peg that extends towards the recording media.

Figure 1:
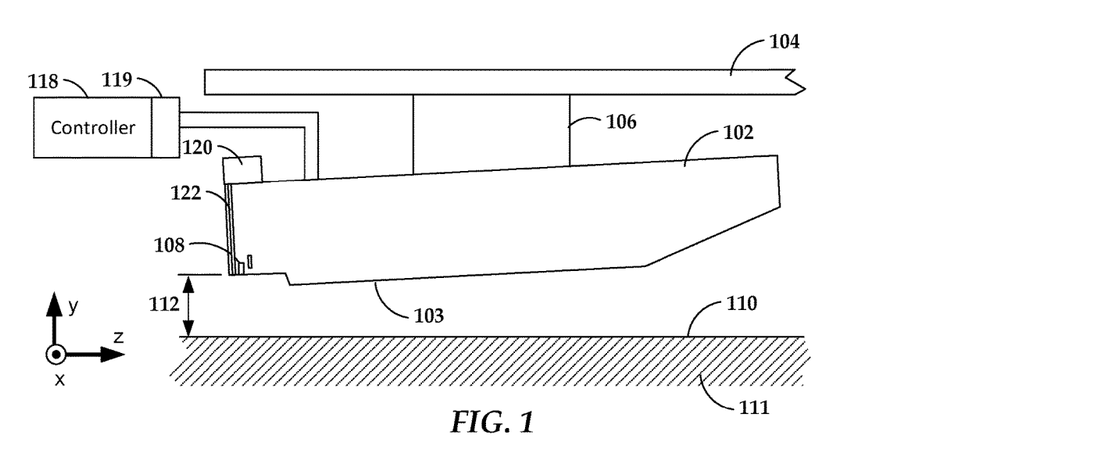
FIG. 1 is a block diagram of a hard drive slider and media arrangement according to an illustrative embodiment.

In reference now to FIG. 1, a block diagram shows a side view of a read/write head 102 according to an example embodiment. The read/write head 102 may be used in a magnetic data storage device, e.g., HAMR hard disc drive. The read/write head 102 may also be referred as a slider, write head, read head, recording head, etc. The read/write head 102 is coupled to an arm 104 by way of a suspension 106, e.g., a gimbal. The read/write head 102 includes read/write transducers 108 at a trailing edge that are held proximate to a surface 110 of a magnetic recording medium 111, e.g., a magnetic disc. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating.

A controller 118 is coupled to the read/write transducers 108, as well as other components of the read/write head 102, such as heaters, sensors, etc. The controller 118 may be part of general- or special-purpose logic circuitry that controls the functions of a storage device that includes at least the read/write head 102 and recording medium 111. The controller 118 may include or be coupled to interface circuitry 119 such as preamplifiers, buffers, filters, digital-to-analog converters, analog-to-digital converters, decoders, encoders, etc., that facilitate electrically coupling the logic of the controller 118 to the signals used by the read/write head 102 and other components.

The illustrated read/write head 102 is configured as a HAMR device, and so includes additional components that form a hot spot on the recording medium 111 near the read/write transducer 108. These components include laser 120 (or other energy source) and waveguide 122. The waveguide 122 delivers light from the laser 120 to components near the read/write transducers 108. These components are shown in greater detail in FIG. 2, which is a block diagram illustrating a cross-sectional view of the read/write head 102 according to an example embodiment.

Figure 2:
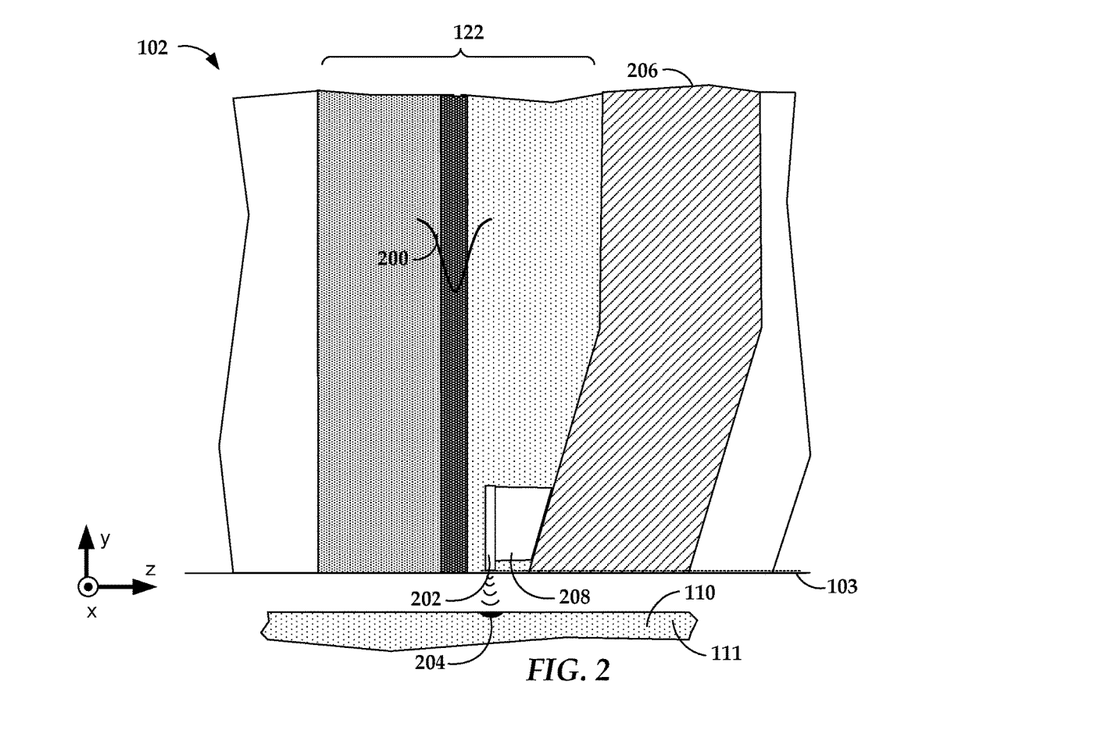
FIG. 2 is a cross-sectional view of a read/write head according to an illustrative embodiment.

As shown in FIG. 2, the waveguide 122 receives electromagnetic energy 200 from the energy source, the energy being coupled to a near-field transducer (NFT) 202. The NFT 202 is made of a metal (e.g., gold, silver, copper, etc.) that achieves surface plasmonic resonance in response to the applied energy 200. The NFT 202 shapes and transmits the energy to create a small hotspot 204 on the surface 110 of medium 111. A magnetic write pole 206 causes changes in magnetic flux near the media-facing surface 103 in response to an applied current. Flux from the write pole 206 changes a magnetic orientation of the hotspot 204 as it moves past the write pole 206 in the downtrack direction (z-direction).

The energy 200 applied to the near-field transducer 202 to create the hotspot 204 can cause a significant temperature rise in a local region near the media-facing surface 103. The near-field transducer 202 may include a heat sink 208 that draws away some heat, e.g., to the write pole 206 or other nearby heat-conductive component. Nonetheless, the temperature increase near the near-field transducer 202 can be significant, leading to degradation of the near-field transducer 202 and other components over time. As such, techniques described herein facilitate increasing thermal robustness of the near-field transducer.

Figure 3:
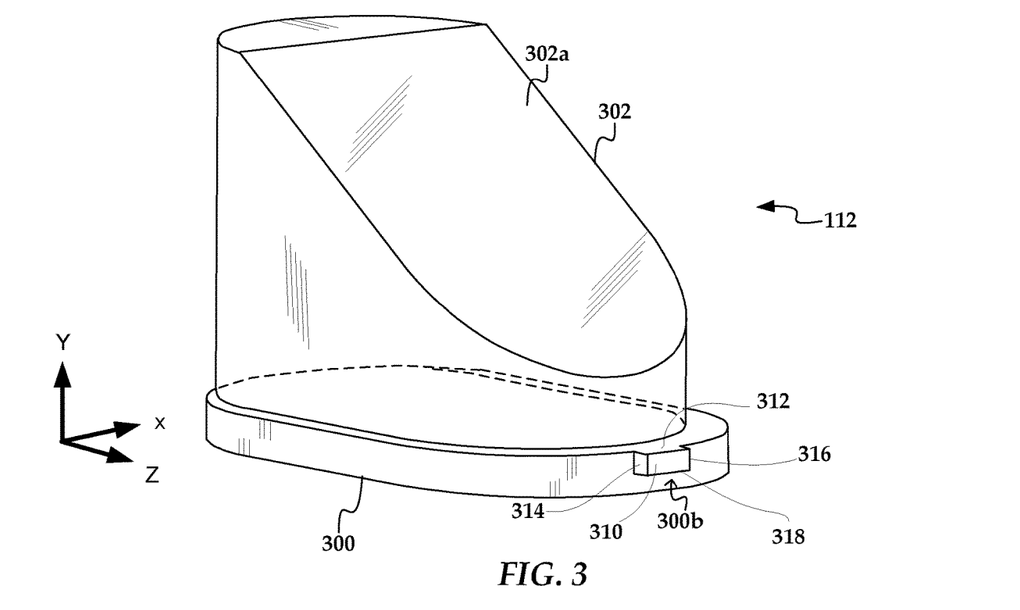
FIG. 3 is a perspective view of a near field transducer according to an illustrative embodiment.

In FIG. 3, a perspective views show details of a device 112 including a NFT. The device 112 can include two parts: a disc 300 and a heat sink 302 proximate to (e.g., deposited directly on to) the disc 300. In this example, the outline of the disc 300 on the xz-plane (which is a substrate-parallel plane) is enlarged relative to the heat sink 302, although they may be the same size. The heat sink 302 can include an angled surface 302a that is located proximate to a write pole (see, e.g., write pole 206 in FIG. 2).

The disc 300 acts as a collector of optical energy from a waveguide and/or focusing element. The disc 300 achieves surface plasmon resonance in response to the optical energy and the surface plasmons are directed to the medium via a peg 300b that extends from the disc 300. It should be noted that the heat sink may also contribute to the energy transfer process and in some such embodiments a NFT does not necessarily include a separate disc and heat sink but a single component that can act as both. In this example, the disc 300 is configured as an elongated plate with rounded (e.g., circular) ends, also referred to as a stadium or capsule shape. Other enlarged portion geometries may be used, including circular, rectangular, triangular, etc.

Figure 4:
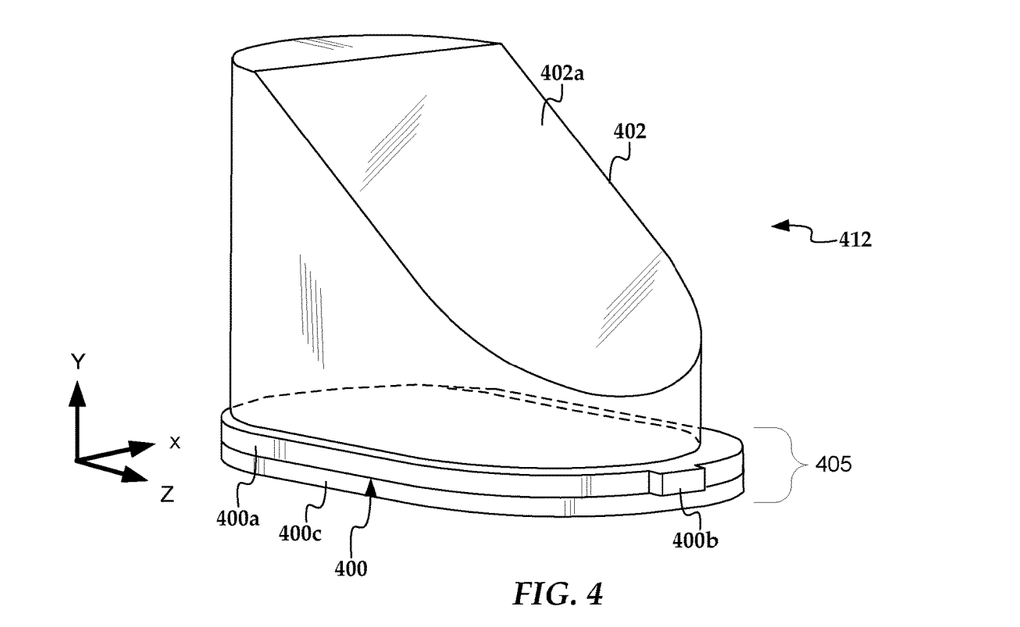
FIG. 4 is a perspective view of a near field transducer according to an illustrative embodiment.

In FIG. 4, a perspective views show details of a device 412 according to an example embodiment. The device 412 includes a NFT 405 and a heat sink 402 proximate to (e.g., deposited directly on to) the disc 400 of the NFT 405. In this example, the outline of the disc 400 on the xz-plane (which is a substrate-parallel plane) is enlarged relative to the heat sink 402, although they may be the same size. The heat sink 402 includes an angled surface 402a that is located proximate to a write pole (see, e.g., write pole 206 in FIG. 2).

The disc 400 includes a top disc 400a that acts as a collector of optical energy from a waveguide and/or focusing element. The top disc 400a achieves surface plasmon resonance in response to the optical energy and the surface plasmons are directed to the medium via a peg 400b that extends from top portion 400a. In this example, the top portion 400a is configured as an elongated plate with rounded (e.g., circular) ends, also referred to as a stadium or capsule shape. Other enlarged portion geometries may be used, including circular, rectangular, triangular, etc.

The disc 400 also includes a bottom disc 400c. The bottom disc 400c can also be referred to as a sunken disc. The term "sunken disc" refers to a base or bottom portion that extends below the peg, as shown by the base portion 400c in FIG. 3. This can also be described as the peg extending beyond the bottom disc 400c. In some embodiments, such as that depicted in FIG. 4, the bottom disc 400c and the top disc 400a can have the same outline shape (e.g., stadium shape) as well as a same outline size. In some embodiments, the bottom disc 400c and the top disc 400a can have different outline shapes, different outline sizes, or combinations thereof. The peg 400b extends beyond the bottom disc 400c. The bottom portion 400c is disposed proximate a light delivery structure (e.g., a waveguide core) and away from a write pole. In some embodiments, the bottom disc 400c may likely be, but need not be, the primary collector of optical energy.

Materials of the NFT can be oxidized during operation of a HAMR device. Methods or structures to minimize or even prevent such oxidation could increase the thermal stability and therefore the reliability of the NFT and the overall device. Disclosed herein are structures and methods of forming such structures to prevent oxidation of the NFT material.

In some embodiments, materials for the peg, the disc, the heat sink, or any combinations thereof can include aluminum (Al), antimony (Sb), bismuth (Bi), chromium (Cr), cobalt (Co), copper (Cu), erbium (Er), gadolinium (Gd), gallium (Ga), gold (Au), hafnium (Hf), indium (In), iridium (Ir), iron (Fe), manganese (Mn), molybdenum (Mo), nickel (Ni), niobium (Nb), osmium (Os), palladium (Pd), platinum (Pt), rhenium (Re), rhodium (Rh), ruthenium (Ru), scandium (Sc), silicon (Si), silver (Ag), tantalum (Ta), tin (Sn), titanium (Ti), vanadium (V), tungsten (W), ytterbium (Yb), yttrium (Y), zirconium (Zr), or combinations thereof. Illustrative examples of materials for the peg, the disc, the heat sink, or any combinations thereof can include binary and/or ternary alloys including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative examples of materials for the peg, the disc, the heat sink, or any combinations thereof can include lanthanides, actinides, or combinations thereof including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative examples of materials for the peg, the disc, the heat sink, or any combinations thereof can include dispersions including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative examples of materials for the peg, the disc, the heat sink, or any combinations thereof can include alloys or intermetallics based on or including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative alloys or intermetallics can include, for example binary and ternary silicides, nitrides, and carbides. For example vanadium silicide (VSi), niobium silicide (Nb Si), tantalum silicide (TaSi), titanium silicide (TiSi), palladium silicide (PdSi) for example zirconium nitride (ZrN), aluminum nitride (AlN), tantalum nitride (TaN), hafnium nitride (HfN), titanium nitride (TiN), boron nitride (BN), niobium nitride (NbN), or combinations thereof. Illustrative carbides can include, for example silicon carbide (SiC), aluminum carbide (AlC), boron carbide (BC), zirconium carbide (ZrC), tungsten carbide (WC), titanium carbide (TiC) niobium carbide (NbC), or combinations thereof. Additionally doped oxides can also be utilized. Illustrative doped oxides can include aluminum oxide (AlO), silicon oxide (SiO), titanium oxide (TiO), tantalum oxide (TaO), yttrium oxide (YO), niobium oxide (NbO), cerium oxide (CeO), copper oxide (CuO), tin oxide (SnO), zirconium oxide (ZrO) or combinations thereof. Illustrative examples of materials for the peg, the disc, the heat sink, or any combinations thereof can include conducting oxides, conducting nitrides or combinations thereof of various stoichiometries where one part of the oxide, nitride or carbide includes Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr, or combinations thereof. Illustrative examples of materials for the peg, the disc, the heat sink, or any combinations thereof can include a metal including Al, Sb, Bi, Cr, Co, Cu, Er, Gd, Ga, Au, Hf, In, Ir, Fe, Mn, Mo, Ni, Nb, Os, Pd, Pt, Re, Rh, Ru, Sc, Si, Ag, Ta, Sn, Ti, V, W, Yb, Y, Zr doped with oxide, carbide or nitride nanoparticles. Illustrative oxide nanoparticles can include, for example, oxides of yttrium (Y), lanthanum (La), barium (Ba), strontium (Sr), erbium (Er), zirconium (Zr), hafnium (Hf), germanium (Ge), silicon (Si), calcium (Ca), aluminum (Al), magnesium (Mg), titanium (Ti), cerium (Ce), tantalum (Ta), tungsten (W), thorium (Th), or combinations thereof. Illustrative nitride nanoparticles can include, for example, nitrides of zirconium (Zr), titanium (Ti), tantalum (Ta), aluminum (Al), boron (B), niobium (Nb), silicon (Si), indium (In), iron (Fe), copper (Cu), tungsten (W), or combinations thereof. Illustrative carbide nanoparticles can include, for example carbides of silicon (Si), aluminum (Al), boron (B), zirconium (Zr), tungsten (W), titanium (Ti), niobium (Nb), or combinations thereof. In some embodiments nanoparticles can include combinations of oxides, nitrides, or carbides. It is to be understood that lists of combinations of elements are not exclusive to monoatomic binary combinations, for example VSi is taken to include V2Si and VSi2, for example.

In some embodiments, disclosed NFTs, or at least portions thereof (e.g., pegs, discs, heat sinks, or combinations thereof) can be made of materials such as gold (Au), silver (Ag), copper (Cu), aluminum (Al), rhodium (Rh), iridium (Ir), or alloys thereof. In some disclosed embodiments one or more portions of a NFT can include a protective layer thereon. It is thought, but not relied upon that the protective layer may serve to prevent or at least minimize oxidation of the underlying NFT material. In some embodiments, one or more portions of a NFT can include (in addition to a protective layer thereon) a blocking layer within a NFT or a portion thereof. The protective layer can be formed in situ during operation of the device, before operation of the device, or via a combination thereof. The optional blocking layer within the NFT can also be formed in situ during operation of the device, before operation of the device, or via a combination thereof.

Figure 5A:
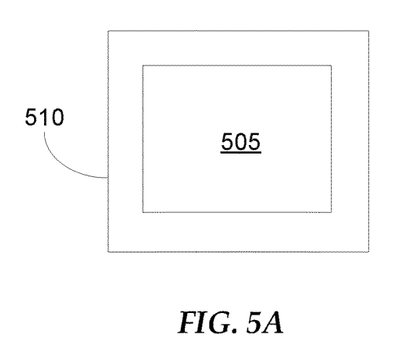
FIGS. 5A, 5B and 5C are cross sections of portions of NFTs including a protective layer (FIG. 5A), a blocking layer (FIG. 5B) and both a protective layer and a blocking layer (FIG. 5C).

FIG. 5A shows a non-specific portion of a NFT 505, depicted simply by a box that includes a protective layer 510 thereon. It should be noted that any portion or portions of a NFT can have a protective layer formed thereon. In some embodiments, a peg of a NFT can have a protective layer formed thereon. In some such embodiments, at least one portion of at least one of the surfaces of the peg can have a protective layer formed thereon. FIGS. 2 to 4 above can be consulted for more specific illustrative information about possible NFT structures and possible NFT structures that could be protected with a protective layer. Protective layers may be formed on a bottom surface of a peg. Such a protective layer could additionally be useful (in addition to being protective) as a seed layer, adhesive layer, or either. In some embodiments such protective layers could be formed by supplying an oxygen source to the bottom surface, for example from an underlying layer. Additionally, or alternatively, such protective layers could be formed if there is oxygen flowing through that interface.

Figure 5B:
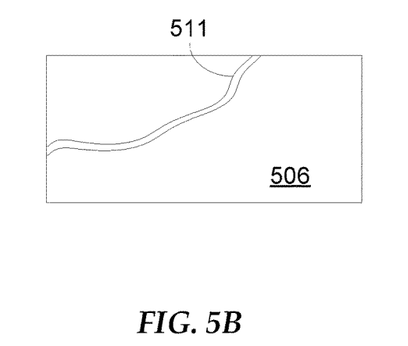

FIG. 5B shows a non-specific portion of a NFT 506, depicted simply as a rectangle that includes a blocking layer 511 therein. It should be noted that, as in any of the figures, the blocking layer 511 is not necessarily depicted to scale. The blocking layer 511 can be positioned within any portion of the NFT. The blocking layer 511 need not have a constant thickness and need not be contiguous, for example. An optional blocking layer 511 can function to block the path of oxygen from one portion of the NFT, can function to block the path of diffusing materials from one portion of the NFT to another, or any combination thereof. In some embodiments, blocking layers 511 can be formed along one or more grain boundaries that were present in the material of the NFT after being formed.

Figure 5C:
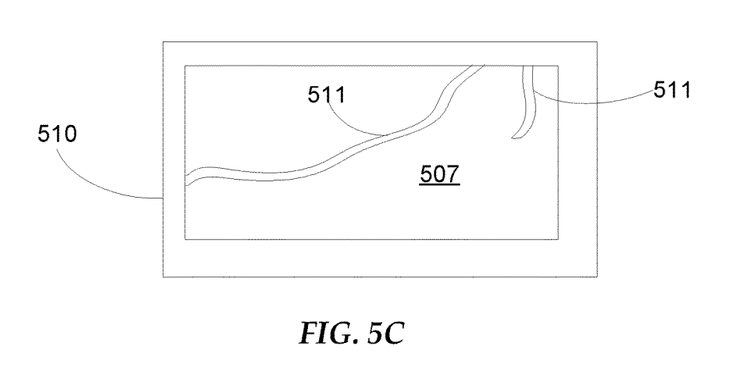

FIG. 5C shows an illustrative embodiment where the NFT 507 includes both a protective layer 510 and a blocking layer 511. It should also be noted, as seen in FIG. 5C that a blocking layer can include an oxide structure at more than one grain boundary and the oxide structures or layers do not need to be connected.

Disclosed protective layers can include any metal oxide. In some embodiments, a protective layer can include one or more oxides of one or more metals making up the NFT itself.

In some embodiments, a protective layer can include one or more oxides of one or more of the metals that make up the NFT and provide the NFT with its plasmonic function. In some embodiments, a protective layer can include one or more oxides of one or more of the metals that make up the NFT but do not provide the NFT with its plasmonic function. In some embodiments, a protective layer can include one or more oxides of a metal that is not present in any substantial amount in the NFT. In some embodiments, a protective layer can include one or more oxides of one or more metals making up the NFT itself (metals that provide the NFT with its plasmonic function, metals that do not provide the NFT with its plasmonic function, or some combination thereof), one or more metals that are not present in any substantial amount in the NFT, or any combination thereof.

Oxides, for example oxides of metal M, as referred to herein include all forms of compounds that include oxygen and the metal M, regardless of the oxidation state of M. It should also be noted that oxides of metal M can include metals other than metal M, for example a second metal, M2 could also be included and the compound can still be considered an oxide of metal M. It should also be noted that the protective layer can include materials other than oxides. For example, a protective layer could include oxides of metal M and metal M for example. Optionally, a protective layer could include oxides of metal M, metal M, oxides of a second metal M2, metal M2, (and so on with additional metals) or any combination thereof. In some embodiments, M2 can be the material of the peg.

Disclosed protective layers can have various thicknesses. In some embodiments, protective layers need not have a constant thickness. In some embodiments, protective layers can be described by their average thickness. In some embodiments, a protective layer can have an average thickness of not less than 10 nm not less than 5 nm, or not less than 1 nm. In some embodiments, a protective layer can have an average thickness of not greater than 15 nm, not greater than 10 nm, not greater than 5 nm, or not greater than 2 nm. The method used to form a given protective layer can, at least in part, dictate the thickness thereof.

Disclosed protective layers include at least one metal oxide. It is thought that this metal oxide may prevent or at least minimize oxidation of the underlying NFT material.

In some embodiments, the at least one metal oxide can include a metal oxide of the plasmonic material of the NFT, which can be referred to as the NFT metal. In some embodiments, such illustrative metal oxides can include oxides of gold (Au), silver (Ag), copper (Cu), aluminum (Al), rhodium (Rh), iridium (Ir), or combinations thereof. In some embodiments, such illustrative metal oxides can include oxides of rhodium (e.g., rhodium oxide).

In some embodiments, the at least one metal oxide can include a metal oxide of a metal in the NFT that is not the plasmonic material. In some embodiments the non-plasmonic metal from the NFT can be one that is present in the NFT for purposes of affecting the NFT, for purposes of forming a protective layer, or combinations thereof. Illustrative metals that can be within the NFT and ultimately form part of the protective layer can include metals that have a higher oxidation tendency than the plasmonic metal of the NFT, metals that have a relatively high tendency to diffuse out of the plasmonic metal of the NFT, or any combination thereof, for example. In some embodiments, metals can be deposited outside or on the NFT and then oxidized to form the protective layer. In some embodiments where a metal may be deposited with the plasmonic NFT material, the tendency of the metal to diffuse out of the plasmonic material may be a highly relevant property because once it diffuses out, it will be the first thing that is contacted by oxygen, thereby making the oxidation tendency less relevant.

In some specific, illustrative embodiments, metal oxides that can be present in the protective layer, regardless of the method of formation, can include for example metals that have a higher oxidation tendency than the metal(s) of the NFT, metals that have a relatively high tendency to diffuse out of the NFT, or any combination thereof.

Table 1 below shows the free energy of oxide formation for various metals. The free energy of oxide formation indicates the oxidation tendency of a material.

TABLE 1

| Material | ΔG oxide (KJ/mole O$_2$) |
|---|---|
| Ag | 0 |
| Al | −1000 |
| Au | 70 |
| B | −718 |
| Ba | −1000 |
| Be | −1100 |
| Bi | −179 |
| C | −395 |
| Ca | −1150 |
| Cd | −400 |
| Co | −400 |
| Cr | −650 |
| Cu | −250 |
| Er | −1152 |
| Fe | −250 |
| Ga | −400 |
| Ge | −470 |
| Hf | −950 |
| In | −330 |
| Ir | −130 |
| K | −560 |
| La | −1128 |
| Li | −1000 |
| Mg | −1130 |
| Mn | −680 |
| Mo | −500 |
| N | 89 |
| Na | −580 |
| Nb | −720 |
| Ni | −370 |
| Os | −100 |
| P | −700 |
| Pb | −330 |
| Pd | −100 |
| Pt | −80 |
| Rb | −500 |
| Re | −330 |
| Rh | −200 |
| Ru | −200 |
| S | −400 |
| Sb | −318 |
| Sc | −1157 |
| Se | −150 |
| Si | −800 |
| Sn | −460 |
| Sr | −981 |
| Ta | −800 |
| Te | −270 |
| Ti | −950 |
| Tl | −129 |
| V | −740 |
| W | −520 |
| Y | −1065 |
| Zn | −705 |
| Zr | −1000 |

Table 2 below shows the activation energy of atom diffusion on a rhodium (100) plane (using rhodium as an example only). This property indicates the tendency of the material to diffuse out of, in this case, rhodium (Rh).

TABLE 2

| Material | Activation Energy (eV) |
|---|---|
| Ni | 0.76 |
| Cu | 0.74 |
| Pd | 0.66 |
| Ag | 0.5 |
| Pt | 0.66 |
| Au | 0.55 |

Specific, illustrative but non-limiting examples of NFT material can include, for example gold (Au), silver (Ag), copper (Cu), aluminum (Al), rhodium (Rh), iridium (Ir), or combinations thereof. In some embodiments, specific, illustrative but non-limiting examples of NFT material can include, for example rhodium (Rh), aluminum (Al), silver (Ag), copper (Cu), or combinations thereof. In some embodiments, specific, illustrative but non-limiting examples of NFT material can include, for example rhodium (Rh), aluminum (Al), or combinations thereof. In some embodiments, a specific, illustrative but non-limiting example of a NFT material can include, for example rhodium (Rh), iridium (Ir), or combinations thereof. In some embodiments, possible metals that may be useful to form protective layers can be determined based on a comparison of properties of metals with a (or more than one) chosen NFT material.

In some embodiments, specific, illustrative but non-limiting examples of NFT material can include, for example rhodium (Rh), aluminum (Al), or combinations thereof. In some embodiments, the material of the NFT, e.g., Rh or Al in some cases, can be utilized to form a metal oxide for the protective layer. Specific illustrative metals that may have a higher tendency to diffuse out of rhodium (Rh) for example can include palladium (Pd), iron (Fe), or combinations thereof. Specific illustrative metals that may have a higher oxidation tendency than rhodium (Rh), for example can include for example yttrium (Y), aluminum (Al), silicon (Si), chromium (Cr), tantalum (Ta), titanium (Ti), zirconium (Zr), lanthanum (La), molybdenum (Mo), nickel (Ni), cobalt (Co), germanium (Ge), or combinations thereof. In some embodiments, specific illustrative metals that can be utilized can also include ruthenium (Ru), iridium (Ir), platinum (Pt), or combinations thereof. Such materials may be useful in combination with Rh for a NFT material because they have an oxidation tendency that is similar to rhodium (Rh), therefore such a material would be fairly like to oxidize at the same time or immediately before Rh. A specific illustrative example of a metal that may be useful with rhodium as a plasmonic material can include for example Pd. Another specific illustrative example of a metal that may be useful with rhodium as a plasmonic material can include for example Al.

Various methods and processes can be utilized to form disclosed protective layers. In some embodiments, a plasmonic material(s) for the NFT and a metal for the protective layer can be deposited, a NFT can be formed and then the metal for the protective layer can be oxidized. In some embodiments, a plasmonic material(s) for the NFT can be deposited, the NFT can be formed, a metal for the protective layer can be deposited and then oxidized. In some embodiments, a plasmonic material(s) for the NFT can be deposited, the NFT can be formed and then a metal oxide can be deposited for the protective layer.

At least some of the disclosed methods include a step that oxidizes a metal. Such steps can be referred to as oxidation treatments. Any commonly utilized oxidation treatment can be utilized. Illustrative oxidation treatments can include chemical oxidation. In some embodiments, chemical oxidation can include treatment with a source of oxygen, including for example oxygen gas ($O_2$), ozone ($O_3$), atomic oxygen (O), hydrogen peroxide ($H_2O_2$), oxygen ($O_2$) radical shower, or combinations thereof. Illustrative oxidation treatments can include subjecting the metal to a temperature that is above its oxidation temperature. The specific oxidation temperature or the temperature that would need to be reached to affect oxidation would be dependent, at least in part, on the particular metal being oxidized. In some embodiments, the temperature of oxidation is above a temperature that is likely to occur during operation of the NFT in a HAMR device. In some embodiments subjecting the NFT containing plasmonic material and metal can also advantageously function to force or enhance diffusion of the metal out of the plasmonic material. Oxidation of the metal may also, in some circumstances, serve to drive the metal oxide out of the plasmonic material.

Some disclosed embodiments of methods of forming include depositing a metal that will eventually be part of the protective layer with the plasmonic material for the NFT at substantially the same time. The plasmonic material and metal can be deposited using many different methods, including for example co-sputtering the two materials from multiple (at least two) targets, sputtering the two materials from a composite target, by depositing separate layers including the two materials, or by combinations thereof. Specific illustrative examples of such methods can include depositing rhodium (Rh) as the plasmonic material and a metal. Specific illustrative examples of metals that may be useful for use with Rh can include, for example Y, Al, Si, Cr, Ta, Ti, Zr, La, Mo, Ni, Co, Ge, Pd, Fe, Ru, Ir, Pt, or combinations thereof. A specific illustrative example of a metal that may be useful with Rh can include for example Pd. Another specific illustrative example of a metal that may be useful with Rh can include for example Al. Other specific illustrative examples of such methods can include depositing aluminum (Al) as the plasmonic material and a metal. Specific illustrative examples of metals that may be useful for use with Al can include, for example Y, Al, Si, Cr, Ta, Ti, Zr, La, Mo, Ni, Co, Ge, Pd, Fe, Ru, Ir, Pt, or combinations thereof.

The amounts of the at least two materials can vary. In some embodiments, the majority of the material deposited (whether co-sputtered, alloyed, or formed via multilayers) is the plasmonic material. In some embodiments not greater than 30 atomic % (at %) of the metal is deposited, not greater than 15 at % of the metal is deposited, or not greater than 5 at % of the metal is deposited. In some embodiments, not less than 0.05 at % of the metal is deposited, not less than 1.5 at % of the metal is deposited, or not less than 3 at % of the metal is deposited.

Once both materials have been deposited (either mostly homogeneous or heterogeneously, e.g., multiple layers), a NFT or a portion of a NFT can be formed from the deposited materials. The peg, the disc, or combinations thereof can be formed from the deposited two (at least) component material. This can be accomplished using known patterning techniques, processes, other methods, or combinations thereof known to those of skill in the art.

At some point after the NFT has been formed, the NFT can be subjected to an oxidation treatment (examples of which were discussed above). In some embodiments, the metal that will ultimately be converted to an oxide for the protective layer (which can be referred to as the "preprotective layer metal") may diffuse out of the plasmonic material on its own due to thermodynamic properties of the system, may diffuse out of the plasmonic material once subjected to oxidation treatment, or combinations thereof.

In some embodiments of disclosed methods, the NFT can be subjected to an oxidation treatment at any point after the NFT has been formed. In some embodiments, the oxidation treatment can take place after the NFT has been formed but before adjacent cladding is deposited thereon (e.g., before the cladding that will for the space between the NFT and the pole, e.g., the NFT to pole space or "NPS"). In some embodiments, the oxidation treatment can take place once the NFT has been formed and at a slider level processing step, e.g., once the NFT within a magnetic recording head has been mounted on a slider. In some embodiments, the oxidation treatment can take place once the NFT within a magnetic recording head has been mounted on a slider but before a head overcoat layer has been formed on the magnetic recording head. In some embodiments, the oxidation treatment can take place during operation of the head. In some embodiments, the oxidation treatment can take place at more than one point, for example at a combination of more than one of the points described above. The oxidation treatment will likely cause the metal to diffuse out of the plasmonic material of the NFT, become oxidized, and form a relatively thin layer of metal oxide which encapsulates the plasmonic material containing NFT, thereby forming a disclosed protective layer. In some embodiments, the protective layer so formed can have a thickness of not greater than 3 nm. Such a protective layer may serve to protect the encapsulated plasmonic material of the NFT from being oxidized during operation of the HAMR device.

Some disclosed methods include depositing a plasmonic material(s) for the NFT, forming the NFT and depositing an oxide that forms a protective layer or depositing a metal and then oxidizing the metal to form the protective layer. In such embodiments, a plasmonic material can be deposited using many different methods, including sputtering for example. It should also be noted that even though such disclosed methods don't require depositing a metal that will become the protective layer at this point, one or more additional materials, besides the plasmonic material, could be deposited at this point (e.g., a second material to modify, alter or control the properties of the plasmonic material or a NFT formed from such a plasmonic material).

Once the plasmonic material (and any other optional material(s)) has been deposited, a NFT or a portion of a NFT can be formed from the deposited material. The peg, the disc, or combinations thereof can be formed from the deposited plasmonic material. This can be accomplished using known patterning techniques, processes, other methods, or combinations thereof known to those of skill in the art.

Next, either an oxide or a metal can be deposited on the NFT or portion thereof. In some embodiments an oxide can be deposited on the NFT or portion thereof to form the protective layer. Another alternative is to deposit a layer including a metal and then subject the layer to an oxidation treatment such as those discussed above.

It should also be noted that any combinations of the above described methods can also be utilized.

All scientific and technical terms used herein have meanings commonly used in the art unless otherwise specified. The definitions provided herein are to facilitate understanding of certain terms used frequently herein and are not meant to limit the scope of the present disclosure.

As used in this specification and the appended claims, "top" and "bottom" (or other terms like "upper" and "lower") are utilized strictly for relative descriptions and do not imply any overall orientation of the article in which the described element is located.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise. The term "and/or" means one or all of the listed elements or a combination of any two or more of the listed elements.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising" and the like. For example, a conductive trace that "comprises" silver may be a conductive trace that "consists of" silver or that "consists essentially of" silver.

As used herein, "consisting essentially of," as it relates to a composition, apparatus, system, method or the like, means that the components of the composition, apparatus, system, method or the like are limited to the enumerated components and any other components that do not materially affect the basic and novel characteristic(s) of the composition, apparatus, system, method or the like.

The words "preferred" and "preferably" refer to embodiments that may afford certain benefits, under certain circumstances. However, other embodiments may also be preferred, under the same or other circumstances. Furthermore, the recitation of one or more preferred embodiments does not imply that other embodiments are not useful, and is not intended to exclude other embodiments from the scope of the disclosure, including the claims.

Also herein, the recitations of numerical ranges by endpoints include all numbers subsumed within that range (e.g., 1 to 5 includes 1, 1.5, 2, 2.75, 3, 3.80, 4, 5, etc. or 10 or less includes 10, 9.4, 7.6, 5, 4.3, 2.9, 1.62, 0.3, etc.). Where a range of values is "up to" a particular value, that value is included within the range.

Use of "first," "second," etc. in the description above and the claims that follow is not intended to necessarily indicate that the enumerated number of objects are present. For example, a "second" substrate is merely intended to differentiate from another infusion device (such as a "first" substrate). Use of "first," "second," etc. in the description above and the claims that follow is also not necessarily intended to indicate that one comes earlier in time than the other.

Thus, embodiments of near field transducers (NFTs) including a protective layer and methods of forming are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A device having an air bearing surface (ABS), the device comprising:
   a near field transducer (NFT) comprising:
     a disc;
     a peg, the peg comprising gold (Au), silver (Ag), copper (Cu), aluminum (Al), rhodium (Rh), iridium (Ir), or combinations thereof and a non-plasmonic metal or metals; and the peg having a front surface at the air bearing surface of the device, an opposing back surface, a top surface that extends from the front surface to the back surface, two side surfaces that extend from the front surface to the back surface and a bottom surface that extends from the front surface to the back surface; and a protective layer disposed on at least one surface of the peg, the protective layer comprising an oxide of the non-plasmonic metal.

2. The device according to claim 1, wherein the peg comprises rhodium (Rh), aluminum (Al), or combinations thereof; and the metal is selected from: palladium (Pd), iron (Fe), yttrium (Y), aluminum (Al), silicon (Si), chromium (Cr), tantalum (Ta), titanium (Ti), zirconium (Zr), lanthanum (La), molybdenum (Mo), nickel (Ni), cobalt (Co), germanium (Ge), ruthenium (Ru), iridium (Ir), platinum (Pt), or combinations thereof.

3. The device according to claim 1, wherein the peg comprises rhodium (Rh) and the metal is palladium (Pd), iron (Fe), or combinations thereof.

4. The device according to claim 1, wherein the peg comprises rhodium (Rh) and the metal is palladium (Pd).

5. The device according to claim 1, wherein the peg comprises rhodium (Rh) and the metal is yttrium (Y), aluminum (Al), silicon (Si), chromium (Cr), tantalum (Ta), titanium (Ti), zirconium (Zr), lanthanum (La), molybdenum (Mo), nickel (Ni), cobalt (Co), germanium (Ge), or combinations thereof.

6. The device according to claim 1, wherein the peg comprises rhodium (Rh) and the metal is ruthenium (Ru), iridium (Ir), platinum (Pt), or combinations thereof.

7. The device according to claim 1, wherein the non-plasmonic metal has a relatively high tendency to diffuse out of the NFT.

8. The device according to claim 1 further comprising one or more blocking layers within the peg, the one or more blocking layers comprising an oxide of a metal that has a higher oxidation tendency than that of the material of the peg.

9. The device according to claim 1, wherein the protective layer has an average thickness from about 1 nm to about 15 nm.

10. The device according to claim 1, wherein the protective layer has an average thickness from about 5 nm to about 10 nm.

11. A device having an air bearing surface (ABS), the device comprising:
a near field transducer (NFT) comprising:
a disc;
a peg, the peg comprising rhodium (Rh) and a non-plasmonic metal or metals; and the peg having a front surface at the air bearing surface of the device, an opposing back surface, a top surface that extends from the front surface to the back surface, two side surfaces that extend from the front surface to the back surface and a bottom surface that extends from the front surface to the back surface; and a protective layer disposed on at least one surface of the peg, the protective layer comprising an oxide of the non-plasmonic metal or metals.

12. The device according to claim 11, wherein the non-plasmonic metal or metals is palladium (Pd), iron (Fe), or combinations thereof.

13. The device according to claim 11, wherein the non-plasmonic metal is palladium (Pd).

14. The device according to claim 11, wherein the non-plasmonic metal is ruthenium (Ru), iridium (Ir), platinum (Pt), or combinations thereof.

15. The device according to claim 11 further comprising one or more blocking layers within the peg, the one or more blocking layers comprising an oxide of a metal that has a higher oxidation tendency than that of the material of the peg.

16. The device according to claim 11, wherein the protective layer has an average thickness from about 1 nm to about 15 nm.

17. A method of forming a NFT, the NFT comprising a peg comprising a plasmonic material and a non-plasmonic metal and having at least one protective layer that comprises an oxide of the non-plasmonic metal thereon, the method comprising:
depositing the plasmonic material and the non-plasmonic metal;
forming the deposited plasmonic material and the non-plasmonic metal into the peg of the NFT; and
subjecting the peg to an oxidation treatment to oxidize the deposited non-plasmonic metal to form the protective layer on the peg.

18. The method according to claim 17 further comprising defining an air bearing surface (ABS) of the peg before subjecting the peg to the oxidation treatment.

19. The method according to claim 17, wherein the plasmonic material and the non-plasmonic metal are deposited via sputtering from a single composite target or multiple targets.

20. The method according to claim 17, wherein the step of subjecting the peg to an oxidation treatment further comprises oxidation during operation of the NFT.

* * * * *